June 2, 1970  J. H. NACHOD  3,515,500
AIRCRAFT ROTOR OR PROPELLER HAVING BLADES WHICH FOLD WITH PITCH
CONTROL MECHANISM CONTROLLING BLADE PITCH DURING NORMAL
OPERATION AND DURING THE FOLDING AND
UNFOLDING OPERATION Filed March 20, 1968

INVENTOR.
JAMES H. NACHOD
BY Vernon F. Hauschild
ATTORNEY

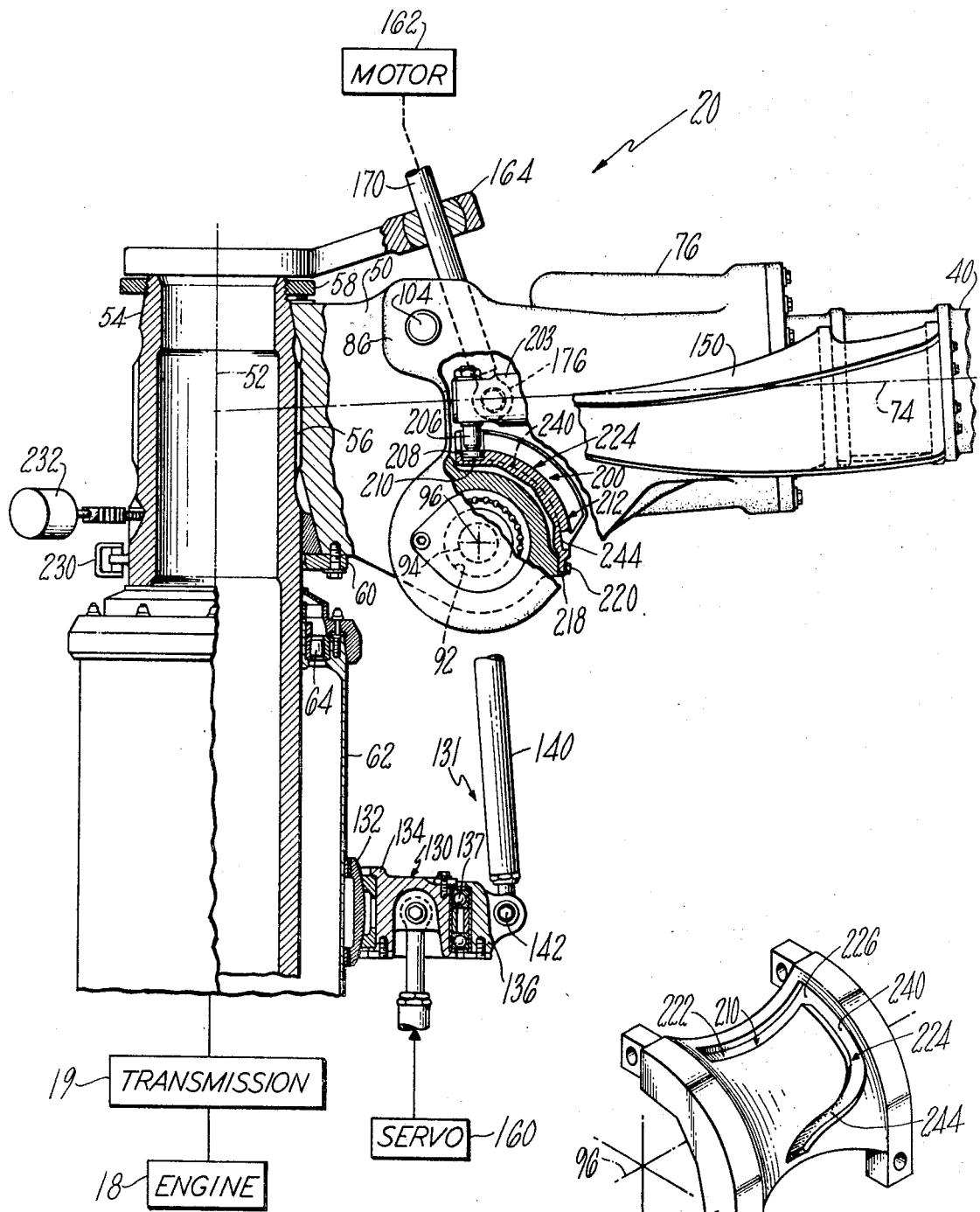

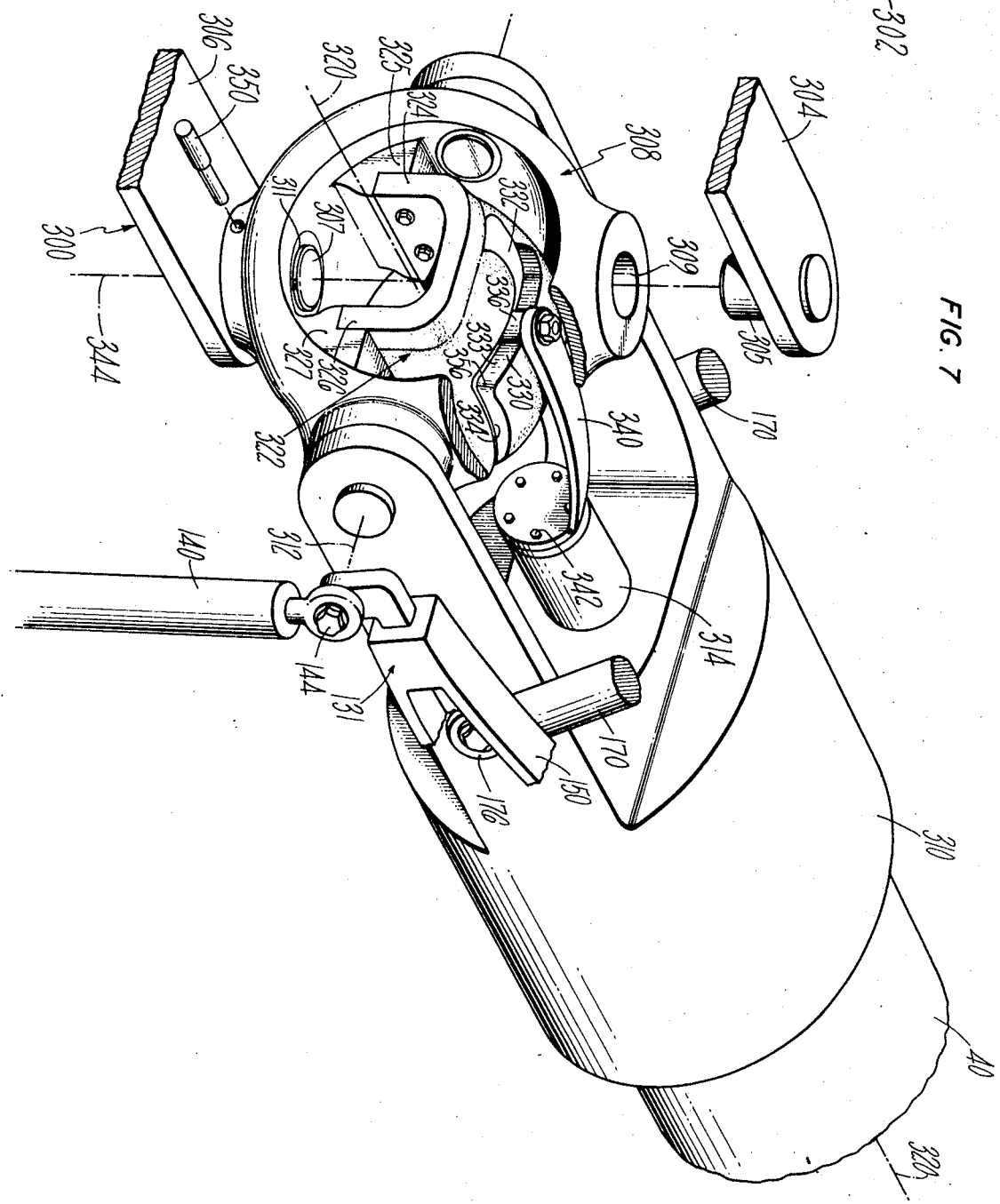

United States Patent Office 3,515,500
Patented June 2, 1970

3,515,500
AIRCRAFT ROTOR OR PROPELLER HAVING BLADES WHICH FOLD WITH PITCH CONTROL MECHANISM CONTROLLING BLADE PITCH DURING NORMAL OPERATION AND DURING THE FOLDING AND UNFOLDING OPERATION
James H. Nachod, East Hartford, Conn., assignor to United Aircraft Corporation, East Hartford, Conn., a corporation of Delaware
Filed Mar. 20, 1968, Ser. No. 714,533
Int. Cl. B64c 27/28, 27/50
U.S. Cl. 416—142                                30 Claims

ABSTRACT OF THE DISCLOSURE

An aircraft propeller or rotor having blades intended to be folded in flight and including provisions for controlling the blade pitch during normal rotor operation and during blade folding operation, the latter including a cam and follower cooperating between the blade and the rotor hub.

---

The invention described herein was made in the course of or under a contract or subcontract thereunder with the Department of the Air Force.

BACKGROUND OF THE INVENTION

This invention relates to aircraft rotors or propellers which may be used either on helicopters, propeller-driven aircraft or convertiplanes which may be operated in more than one mode of operation, such as helicopter mode, propeller mode or fixed-wing mode, and more particularly to aircraft whose rotor or propeller blades are intended for folding in flight.

With the advent of the convertiplane and other related aircraft, the requirement for folding the blades of aircraft rotors or propellers in flight originated. In the past, helicopter rotors have been folded after the aircraft is on the ground, either manually or automatically as shown in U.S. Pats. Nos. 3,050,274, Haight, and 3,097,701, Buivid, usually for the purpose of minimizing the storage or parking space required by the helicopter. In-flight folding of helicopter blades has not hitherto been a requirement but the advent of the convertiplane, wherein a single rotor may be used either as a helicopter rotor or an aircraft propeller, the requirement for inn-flight blade folding occurs when the convertiplane is to be converted from helicopter or propeller mode to fixed-wing mode. Conversely, the blades must be unfolded when converting from fixed-wing mode to propeller or helicopter mode. In-flight folding of rotor blades presents two substantial problems, first, it is highly desirable for drag abatement purposes to fold the blade at a blade pitch which will present minimum drag during the folding or unfolding operation and, secondly, so that the blades present minimum drag when in their folded positions during fixed-wing mode, it is highly desirable that the folded blades nest optimally with the fuselage or engine pod against which they rest and are attached.

It is therefore a primary object of the present invention to provide an aircraft rotor or propeller with foldable blades and with provisions for controlling blade pitch, both during normal rotor or propeller operation and during the blade fold or unfold process.

In accordance with the present invention, the required pitch control is obtained by supporting the blade from a rotatable hub so that the blade will rotate with the hub about an axis of rotation and so that the blade may rotate with respect to the hub about a feathering axis. During normal rotor or propeller operation, mechanism is provided to cause the blade to rotate with respect to the hub about the feathering axis so as to vary blade pitch. In addition, each blade is connected to the hub so as to be foldable with respect thereto and is further connected to the hub through a coacting cam and follower arrangement, which coact in response to blade folding or unfolding motion with respect to the hub so as to cause the blade to vary in pitch to produce minimum drag during the folding process and to produce optimum blade nesting and hence minimum drag when folded.

In accordance with a further aspect of the present invention, the blade fold pitch control mechanism is fully enveloped within the rotor and does not project externally thereof so that this pitch change mechanism has minimum vulnerability to enemy fire.

In accordance with a further aspect of the present invention, the aforementioned cam and follower pitch change control mechanism for use during the blade folding operation is shaped so that it does not interfere with blade pitch variation during normal rotor operation and so that each blade folds with respect to the rotor hub substantially 90° and so as to be in the full feather position during the first approximately 75° of folding for blade slowing purposes and so as to change pitch during the last 15° of the blade fold operation for optimum nesting purposes.

In accordance with still a further aspect of the present invention, the blade pitch change mechanism which is used during normal rotor operation is made ineffective during the blade folding and unfolding operation so that the blade pitch change mechanism for normal rotor operation and the blade pitch change mechanism for the folding-unfolding operation operate independently of and without interference from one another at all times.

The invention permits transition between helicopter or propeller and other flight modes by first feathering the blades by using the normal rotor operation pitch control mechanism so as to stop the rotor in the desired position, preferably with the aid of a rotor brake and a rotor Vernier positioning mechanism, then unlocking the blades for folding, then commencing the blade fold operation sufficiently so that the cam follower of the blade fold pitch control mechanism engages the folding groove of that mechanism so as to provide positive pitch control, then disconnecting the normal rotor operation pitch control mechanism, then continuing the folding process with the cam-follower pitch control mechanism controlling blade pitch so that the blades remain in full feather position through most of the folding operation and so that the blades change pitch from full feather position in the latter portion of the folding operation as required to provide optimum nesting of the blade when folded with respect to the nacelle or pod against which they nest for subsequent locking in position. The reverse procedure is followed when the blades are to be unfolded during the transition between fixed-wing and propeller or helicopter mode.

Since the pitch control mechanism which is used during normal rotor operation is operative during the initial portion of the blade fold process wherein the cam follower is becoming engaged in the folding groove of the blade fold pitch control mechanism, it is an important teaching of this invention that the connection between the blade pitch change horn and the push rod thereto from the swash plate be in substantial alignment at that time with the blade feathering axis so that the pitch control system for normal rotor operation does not buck or interfere with the pitch control system which is operative during folding.

BRIEF DESCRIPTION OF THE DRAWINGS

FIG. 5 is a side view of the rotor construction shown in FIG. 4 and partially broken away to better illustrate the cam and follower pitch change control mechanism.

FIG. 6 is an isometric showing of the cam-groove defining mechanism of the cam-and-follower pitch change control mechanism used in this invention.

FIG. 7 is a showing of this invention used on an articulated rotor.

DESCRIPTION OF THE PREFERRED EMBODIMENT

Figure 1:
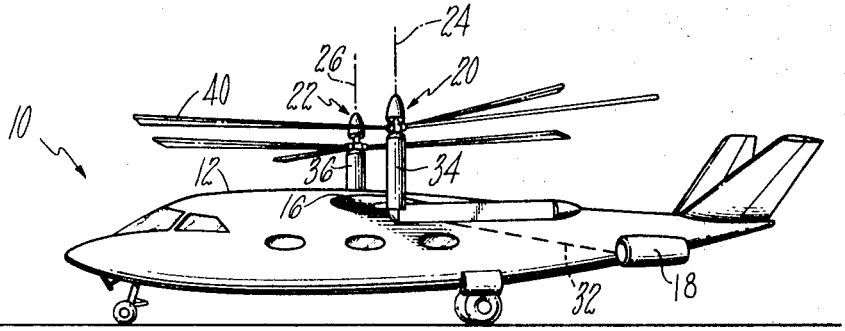
FIG. 1 is a showing of a convertiplane in helicopter mode employing this invention.
Figure 2:
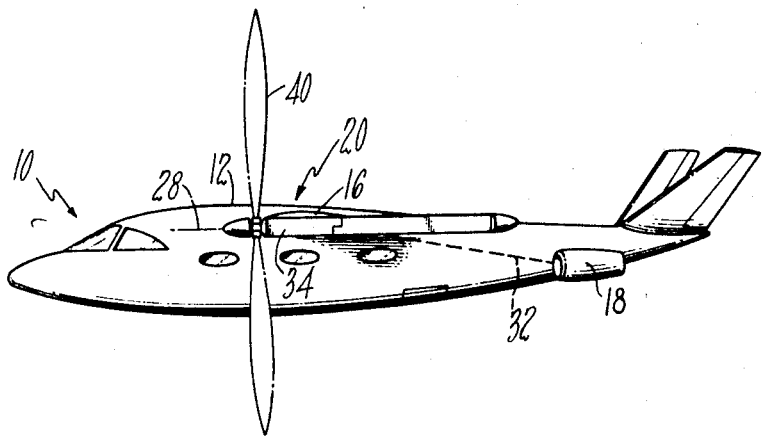
FIG. 2 is a showing of a convertiplane in the propeller mode employing this invention.
Figure 3:
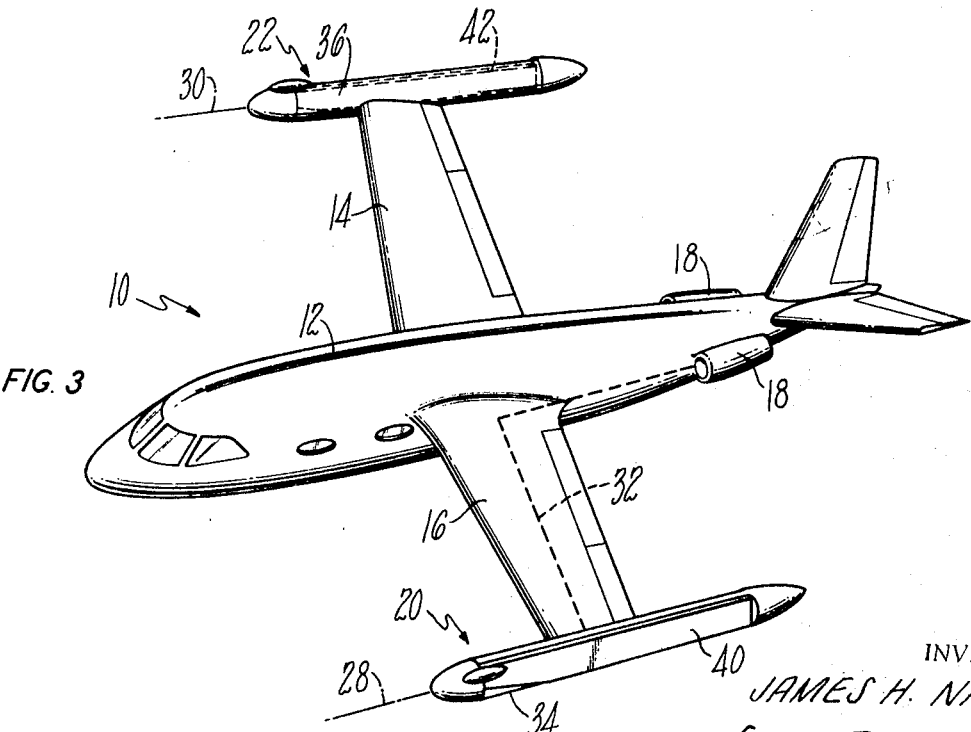
FIG. 3 is a showing of a convertiplane in the fixed-wing mode of operation with the blades folded as in this invention.

Referring to FIGS. 1, 2 and 3 we see convertiplane 10 which includes fuselage 12 with fixed wings 14 and 16 projecting laterally on opposite sides thereof in conventional fashion. Engines, such as jet-type engines 18 may be carried on the aircraft wings, fuselage, or tail or any of these for the purpose of propelling the convertiplane in fixed-wing flight mode as shown in FIG. 3. In addition to fixed-wing mode of operation as shown in FIG. 3, convertiplane 10 is also capable of helicopter mode of operation, engines such as 18 are mechanically includes two rotors or propellers 20 and 22, which are mounted to be pivotable between their FIG. 1 helicopter mode position and the FIG. 2 propeller mode position. In the FIG. 1 position the rotor blades revolve about vertical axes 24 and 26 so that convertiplane 10 is operating in helicopter mode. In the FIG. 2 position, rotors 20 and 22 rotate about horizontal axes of rotation 28 and 30, which axes are substantially 90° from axes 24 and 26, so the convertiplane 10 is operating in a propeller mode of operation. In either the helicopter or propeller mode of operation, engines such as 18 are mechanically connected through conventional linkage 32 to drive rotors 20 and 22. Rotors 20 and 22 are carried in pods or housings 34 and 36, which are positioned at the tips of fixed wings 14 and 16 and are movable with respect thereto between axes 24 and 26 and axes 28 and 30. Engine 18 may be of the type shown in U.S. Pats. Nos. 2,711,631 and 2,747,367. When convertiplane 10 is to be operated in the FIG. 3 fixed-wing mode of operation, it is highly desirable that the blades of rotors 20 and 22 be folded so as to prevent minimum drag during flight. This folding of the blades can take place either during transition from the helicopter mode to the fixed-wing mode or, preferably, during transition from the propeller mode to the fixed-wing mode. All helicopter blades, such as 40 and 42, may accordingly be folded in flight as a part of the transition between one of the other modes and the fixed-wing mode.

Before the advent of the convertiplane, blades of rotors were folded only on the ground for purposes of minimizing required storage space for helicopter. With the advent of in-flight blade folding, consideration had for the first time to be given to controlling the pitch of the helicopter blades during the folding and unfolding operation to permit in-flight blade folding with the blades creating minimum drag and to permit optimum nesting of the blades when folded to produce minimum drag during fixed-wing mode of operation. In addition to control of the rotor blades during the folding operation, it is also necessary to provide pitch control of the baldes during both the helicopter mode and fixed-wing mode of operation.

It is accordingly necessary that rotors be provided which have blades capable of folding and which are capable of pitch blade control during normal rotor operation and which are also capable of pitch blade control during the blade folding and unfolding operation.

Figure 4:
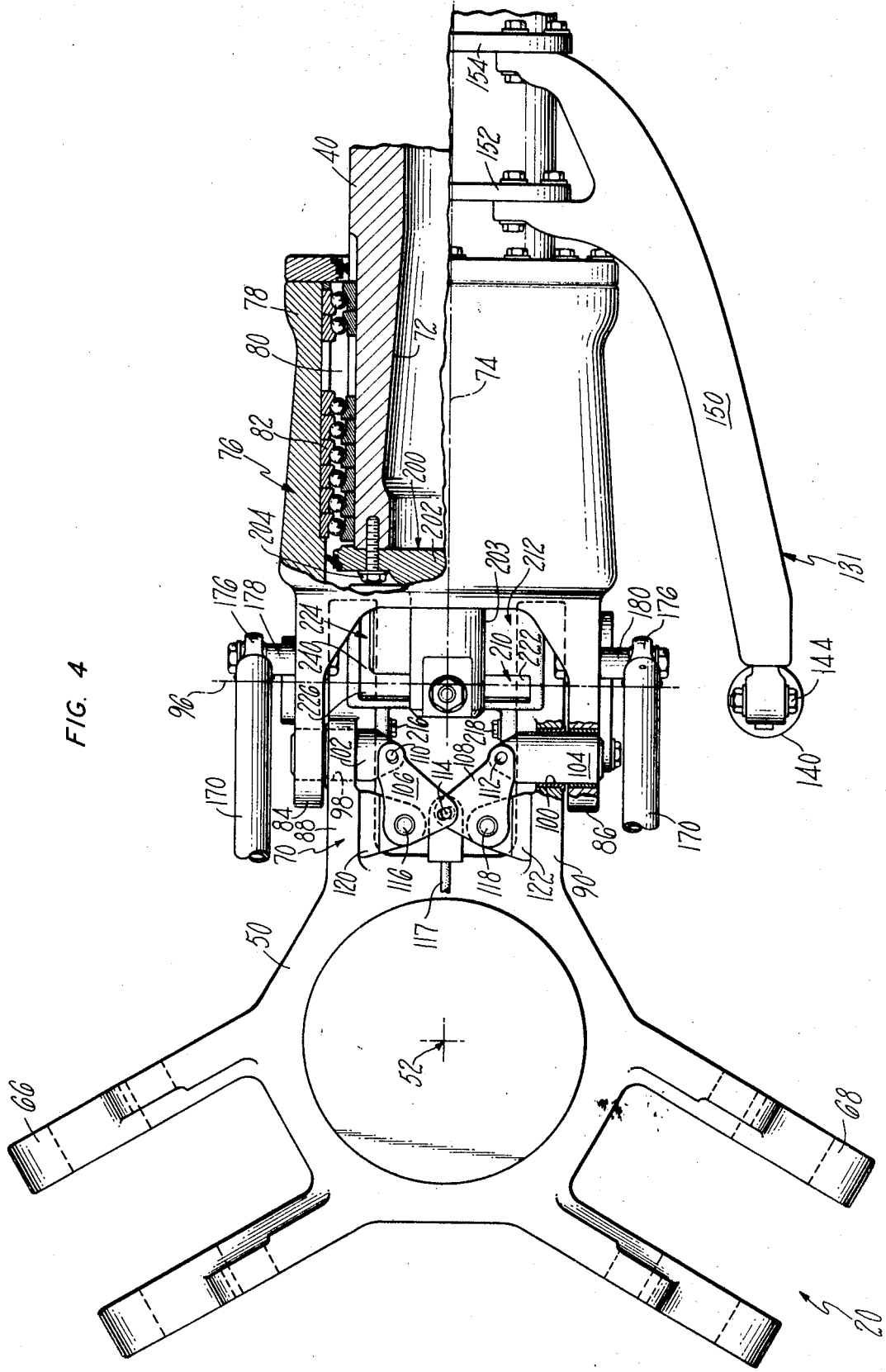
FIG. 4 is a plan view of a rotor and is partially broken away to show the cam and follower pitch change control utilized during the blade folding and unfolding operation in this invention.

The mechanism taught herein for accomplishing these functions is best shown in FIGS. 4 and 5 to which reference will now be made. Helicopter rotor or propeller 20 includes a plurality of blades 40 projecting from hub 50 for rotation therewith about axis of rotation 52. Rotor hub 50 is mounted on and driven in rotation by rotor shaft 54 to which it is connected in drive relation by interlocking splines 56 and it is positioned with respect thereto by locking members 58 and 60. Rotor shaft 54 is driven by engine 18, preferably through transmission 19, and is positioned for rotation about axis 52 by support housing 62, from which shaft 54 is supported by spaced bearings, one of which is shown at 64. Hub 50 includes three pair of radially projecting flange members 66, 68 and 70, which are preferably equally spaced circumferentially about axis 52. While a three-bladed rotor is illustrated, it should be borne in mind that any number of blades could have been used in the rotor without departing from the teaching of this invention. As best shown in FIG. 4, blade 40 includes a root spindle 72 which is of circular cross section and concentric about blade pitch change or feathering axis 74. Blade 40 is connected to hub 50 through sleeve 76, which is cylindrical at its outer portion 78 and envelops blade spindle 72 to define annulus 80 therebetween. Stack anti-friction bearings 82 are positioned in annulus 80 and serve to support blade spindle 72 and hence blade 40 for rotary pitch change motion about feathering axis 74 with respect to sleeve 76 and hence hub 50.

The inner end of sleeve 76 is bifurcated to define spaced face members 84 and 86. To permit blade 40 to fold and unfold with respect to hub 50, flange members 84 and 86 of sleeve 76 and projection members 88 and 90 of flange member 70 of hub 50 include aligned apertures 92 to receive folding hinge pin 94 (FIG. 5) therewithin so as to permit blade 40 and sleeve 76 to pivot with respect to hub 50 about folding hinge axis 96.

Members 84 and 86 of sleeve 76, 88 and 90 of hub 50 also include aligned apertures 98 and 100 to receive lock pins 102 and 104, respectively, so as to lock blade 40 and spindle 76 from folding with respect to hub 50 when blade folding is not desired. Lock pins 102 and 104 are caused to project into and be retracted from apertures 98 and 100 by the action of crank members 106 and 108, which are pivotally connected to pins 102 and 104 at pivot points 110 and 112, respectively. Crank members 106 and 108 are also pivotally connected to each other at pivot point 114 and to bosses 120 and 122 at pivot points 116 and 118, respectively. Bosses 120 and 122 are supported from the inner surfaces of flange members 88 and 90 so that, as crank members 106 and 108 are caused to pivot about pivot points 116 and 118 by the action of pilot-operated lanyard 117 or other convenient means such as a pilot-operated motor connected thereto, lock pins 102 and 104 are caused to enter or be retracted from apertures 98 and 100, respectively.

To permit blade 40 to change pitch with respect to hub 50 during normal rotor operation when operating in the FIG. 1 helicopter mode or the FIG. 2 propeller mode, rotor 50 is provided with swash plate 130 (FIG. 5) which is capable of rotating around, tilting with respect to, and reciprocating along axis of rotation 52. As best shown in FIG. 5, swash plate 130 includes central spherical bearing member 132 which is mounted for reciprocation along cylindrical support housing 62. Swash plate 130 also includes stationary swash plate member 134 and rotary swash plate member 136 with antifriction bearings 137 separating the stationary and rotary parts of the swash plate. Pitch change push rods 140, one for each blade, are pivotally connected to swash plate 130 at pivot point 142 and are pivotally connected at pivot point 144 (FIG. 4) at their opposite ends to pitch change horn 150, which is also connected to blade 40 at flanges 152 and 154. With this connection between the swash plate 130 and blades 40, the pilot can cause collective pitch change in the blades 40 by actuating a plurality of servos, one of which is shown at 160 so as to cause swash plate 130 to reciprocate along axis 52 thereby causing each of the pitch control push rods 140 to rotate each of the pitch horns 150 an equal amount and accordingly simultaneously vary the pitch of all blades 40 equally. To vary the pitch of the blades 40 cyclically, the servos 160 may be actuated so as to tilt swash plate 130 with respect to axis 52 thereby causing push rods 140 and pitch horns 150 to cause the various blades to change pitch cyclically as they rotate about axis 52. The pitch change mechanism 131 just described is used during normal rotor operation in the FIG. 1 helicopter mode and the FIG. 2 propeller mode.

To cause blades 40 to fold about their folding axes 96 with respect to hub 50, pilot operated motor 162 (FIG. 5) is actuated to cause fold links 170, which are pivotally connected to sleeve 76 at pivot point 176 to move through spherical bearing 164 and thereby cause blade 40 and spindle 76 to fold about folding axis 96. Pins 178 and 180 connect fold links 170 to sleeve 76. It is important to note that pivot members 178 and 180 are positioned radially of the fold axis 96 to thereby cause the blades 40 to fold toward a position parallel to axis 52 as shown in FIG. 3 when motor 162 causes the fold links 170 to move toward swash plate 130 and to also cause blades 40 to pivot about fold axis 96 from their folded to their operable positions when fold links 170 are caused to move away from swash plate 130. It will be obvious to those skilled in the art that a separate motor 162 may be provided for each fold link 170 or a single motor, through conventional mechanical connection, may cause all fold links 170 to move simultaneously.

During the blade folding operation, since bladle folding may occur during flight, it is necessary to control blade fold pitch control system 200. Blade fold pitch controlling. As best shown in FIGS. 4 and 5, the mechanism provided to accomplish blade pitch control and variation during the blade folding and unfolding operation is blade fold pitch control system 200. Blade fold pitch control system 200 includes cam follower mechanism 202 which is attached to blade spindle 72 by any convenient means such as bolts 204 so that the cylindrical portion 203 thereof rotates therewith during blade pitch variations about feathering axis 74. Cam-follower 206 projects from member 202 for rotation therewith and includes roller bearing member 208, which is received in cam slot 210 of cam slot dening member 212. As best shown in FIGS. 4–6, cam slot defining member 212 is arcuate in cross section and positioned substantially circumferentially about the fold hinge 96. Cam slot defining member 212 is attached to hub 50 by bolt members 216 and 218, which are received in flange members 88 and 90 of hub 50. The other end of cam slot defining member 212 is connected to mating surface 218 of hub 50 by bolt member 220. In view of this support means it will be seen that the cam slot defining member 212 is fixed with respect to but readily detachable from hub 50.

The came 210 is contoured as best shown in FIG. 6 so as to include a first groove or slot 222, which lies in a plane perpendicular to feathering axis 74 and in which cam follower roller 208 is received in idling fashion during normal rotor operation in either FIG. 1 helicopter mode or the FIG. 2 propeller mode. When cam follower 206 is positioned in cam slot portion 222, blade fold pitch control system 200 is ineffective so that the complete control of the pitch of blades 40 is accomplished by the swash plate-type pitch control mechanism 131 previously described.

Cam slot 210 also includes folding groove or slot 224 in which cam follower 206 moves during the blade folding process and the blade unfolding process. Cam slot portion 224 permits about 90° of blade folding and is shaped so that as the helicopter blades 40 are caused to fold about blade fold axis 96, cam follower 206 initially follows along portion 240 of folding groove 224 with the blades in their full feather position throughout the major portion of the blade folding operation and preferably throughout the first approximately 75° of blade fold. It will be noted by viewing FIGS. 4–6 that folding groove 224 is substantially straight in this early portion of the blade fold operation as shown in portion 240 thereof. In the latter part of the blade fold operation, as best shown at section 244 of the folding groove 224, the folding groove causes the cam follower 206 to change the pitch of blade 40 drastically in approximately the final 15° of fold of the blades so that the blade is brought to its optimum pitch position for nesting with the nacelle or the like in its fully folded position. In view of this specific contouring of the cam slot defining member 212 it will be seen that the blade is kept in its fully feathered position throughout the major portion of the blade fold process so as to create minimal drag and so that the blade is brought to its optimum pitch position when folded so as to present minimal drag when folded and when the aircraft is in its FIG. 3 fixed-wing mode of operation. The feathering of the blades also results in a slowing down of the blades aerodynamically in order that they may be stopped and stowed.

OPERATION

When it is desired to change from the propeller mode of operation to the fixed-wing mode of operation, the pilot will first use the normal rotor operation pitch control 131 to bring the blades to their full feather position. With the blades feathered and with the help of Vernier drive 232 and brake 230, rotor 20 is brought to and stopped at its desired fold position. Had convertiplane 10 been in helicpoter mode, it would first have been brought to propeller mode and then the fixed wing mode.

Cam slot defining member 212 is contoured so that with the blades in their full feather position, cam follower 206 is positioned in corner position 226 between cam segments 222 and 224. The lock pins 102 and 104 are then released and blade fold means 162 is actuated to cause the blades to commence their folding process. This initial movement of the blades into their fold motion will commit the cam follower 206 to follow the folding groove or slot 224. With the pitch of the blade now committed to the blade fold pitch control system 200, the normal rotor operation pitch control mechanism 131 is made ineffective by hydraulically isolating the servos 160. It will be noted that it is preferable to have the pivot connection 144 between the pitch horn 150 and the pitch control push rod 140 in alignment with the blade fold axis 96 when the blades are in their full feather position so that the normal rotor pitch control 131 does not buck or interfere with the blade fold pitch control system 200 during this initial blade folding operation before the first system 131 is inactivated as just described. As blade folding motion continues, cam follower 206 travels in the full feather portion 140 of folding groove 224 throughout the major portion of the blade folding operation, preferably 75° thereof. When the blade enters its final 15° of fold, the cam follower 206 enters the final portion 244 of the fold groove 224 so as to bring the blade to the desired pitch for its optimum nesting position when fully folded. When the blade is fully folded, it will be secured in position in some convenient fashion with respect to the nacelle against which it rests.

The reverse procedure is followed when the blades are to be unfolded from their fully folded FIG. 3 position to their operable FIG. 1 or FIG. 2 positions.

It will be evident that, due to the nacelle shape variations and the like, each blade 40 will need a different pitch control during folding and in its folded position and therefore the contouring of cam slot 210 will differ from blade-to-blade on different aircraft and even on the same aircraft depending upon the blade position. It will be evident to those skilled in the art that in view of the consrtuction of the blade fold pitch control mechanism 200, blades 40 are interchangeable, and that the rotor hubs 20 and 22 may be interchanged by changing cam member 210.

It will be noted that the entire blade fold pitch control system 200 is fully enveloped within the rotor 20 and does not project therebeyond so as to provide optimum protection of the blade fold pitch control system 200 from enemy fire.

In addition, it will be noted that blades 40 are under full pitch control during all flight regimes. In particular, the normal rotor operation blade pitch control system 131 controls the blade pitch in both the helicopter and propeller mode of operation while the blade fold pitch control system 200 is ineffective. During the initial blade fold motion, both pitch control system 131 and 200 are effective but in view of the fact that connection 144 is in alignment with the fold axis 96 the former does not buck the latter. During the remainder of the blade fold operation the normal blade fold system 131 is ineffective while the pitch of the blade is under the full control of the blade fold pitch control system 200.

It will be noted that the construction of the rotor 20 shown in FIGS. 4 and 5 is of the rigid rotor variety having no flapping or lead-lag pivot connections or joints between the blades and the hub. This invention is also fully applicable to an articulated rotor which is capable of motion about both a lead-lag axis and a flapping axis and such a construction is shown in FIG. 7. An articulated rotor is shown in U.S. Pat. No. 3,097,701.

In such a construction, a star-shaped hub 300 is mounted for rotation about axis 302. Hub 300 includes a plurality of radially extending top and bottom plate members 304 and 306 which include aligned stub shafts 305 and 307 which are pivotally received in mating apertures 309 and 311 so as to support hollow cruciform member 308 for pivotal motion about the lead-lage axis 344. The hollow cruciform member 308 also pivotally connects to and supports blade sleeve 310 for pivotal motion therebetween about flapping and folding axis 312. Blade sindle 314 is supported by conventional stacked bearings within blade sleeve 310 so as to permit the blade 40 to rotate about pitch change axis 320, and thereby vary blade pitch. Cam slot defining member 322 is positioned within hollow cruciform member 308 and has projecting attachment lugs 324 and 326 extending to aligned flanges 325 and 327 of cruciform member 308, thereby supporting the cam defining member 322 within cruciform member 308 with capability for pivot motion with cruciform member 308 about lead-lag axis 344. It will be noted that cam defining member 322 inclues cam slot 330, which has a first normal rotor operation portion 332, a second blade feather operation portion 333 and a third blade fold operation portion 334. Cam follower 336 is supported for controlled motion within slot 330 by support member 340, which is attached to and moves with blade spindle 314 about feathering axis 320 by connecting means 342. Blade spindle 314 is attached to blade 40 within blade sleeve 310. With this construction it will be seen that blade 40 is capable of motion about flapping axis 312, about lead-lag axis 344 and is also capable of pitch variation about feathering axis 320. When the pitch of blade 40 is being controlled by the normal rotor operation pitch control mechanism 131 shown in FIGS. 4 and 5, cam follower 336 moves in idler fashion in slot portion 332 so as not to interfere with the pitch control mechanism 131.

As in the previously described rigid rotor construction of FIGS. 4 and 5, when it is desired to fold blade 40 about axis 312, both cruciform member 308 and therefore cam slot defining member 322 are fixed in position with respect to hub 300 by any convenient means such as solenoid operated plunger 350. By use of pitch control system 131, the blades 40 would be brought to their full feather position so as to enter portion 330 and bring cam follower 336 to corner 356 of cam slot 330. Our blade fold mechanism shown in FIGS. 4 and 5 goes through its initial motion so as to commit cam follower 336 to the control of blade fold pitch control slot 334, at which iime the normal rotor operation pitch control mechanism 131 is deactivated as previously described and the folding process is completed with blades 40 remaining in their full feather position for approximately the first 75° of fold and then changing pitch in the final 15° of fold to attain optimum pitch position for blade nesting in their fully folded positions. The reverse procedure would be followed in unfolding the blades.

Other objects and advantages will be apparent from the specification and claims and from the accompanying drawings which illustrate an embodiment of the invention.

What is claimed is:
1. A helicopter rotor including:
   (1) a plurality of blades each having a feathering axis,
   (2) means mounting said blades on the rotor for pitch change variation about their respective feathering axes and for blade folding with respect to the rotor,
   (3) first means to vary the pitch of said blades about their respective feathering axes during normal operation,
   (4) and second means to vary the pitch of said blades about their respective feathering axes during blade folding operation, and wherein said first and second means are independent of one another and each is inoperative when the other is operating.

2. Apparatus according to claim 1 wherein said second means is a cam and follower mechanism.

3. Apparatus according to claim 1 wherein said second means programs blade pitch throughout the blade folding and unfolding operation.

4. Apparatus according to claim 1 including a hub mounted for rotation about an axis and to which said blades are attached, and further wherein each of said blades includes a cam and follower arrangement completely enveloped within said blade and hub.

5. Apparatus according to claim 4 and further including means to fold said blades with respect to the rotor and wherein said cam and follower arrangement is responsive to blade fold motion to vary the pitch of said blades during blade folding operation.

6. Apparatus according to claim 5 wherein the cam of said cam and follower arrangement is contoured so that said second means is ineffective during normal rotor operation and wherein said cam is further contoured to hold said blades in their full feather position during the inital porton of the blade fold operation and to cause said blades to change blade pitch during the final portion of the blade folding operation so that the blades are at desired final blade pitch when fully folded.

7. Apparatus according to claim 6 wherein each of said blades includes a cylindrical spindle at the radially inboard end thereof, and further including:
   (1) a blade sleeve shaped at its radially outboard end to be of cylindrical cross section to envelop said blade spindle and shaped at its radially inboard end to connect to said hub to permit blade folding therebetween, (2) stacked bearings positioned between and connecting said sleeve to said spindle so that said sleeve is supported from said rotor through said sleeve to be rotatable in pitch change motion about a blade feathering axis, (3) and still further wherein said cam and follower arrangement includes:

(a) a first member connected to said blade spindle for rotation therewith about said feathering axis, (b) a cam follower projecting radially from said first member and carried thereby so as to rotate with said blade about said feathering axis during blade pitch variation during normal rotor operation, (c) a second member constituting a cam defining member fixedly and detachably attached to said hub and defining a first groove extending laterally with respect to said feathering axis and which is positioned to receive said cam follower during normal rotor operation so that said cam follower moves therewithin ineffectively to vary blade pitch during normal rotor operation and further defining a folding groove in which said cam follower moves during blade folding operation and shaped to cause the pitch of the blade to vary during the folding operation.

8. Apparatus according to claim 7 wherein said folding groove is contoured to maintain the blade in its fully feathered position during the initial portion of the blade folding operation and to cause the pitch of the blades to change during the final portion of the blade folding operation to assume final blade pitch when the blade reaches its fully folded position.

9. Apparatus according to claim 8 wherein said folding groove is shaped to permit said blades to fold with respect to said hub approximately 90° and, further, wherein said folding groove is shaped to maintain said blades in their full feathered position during approximately the first 75° of the folding operation and wherein said folding groove is further shaped to cause said blades to change pitch during approximately the final 15° of the folding operation so as to be at final blade pitch when the blades are in their fully folded positions.

10. Apparatus according to claim 9 and including means to lock said sleeve and hence said blade against folding with respect to said hub during normal rotor operation.

11. An aircraft propeller or rotor including:

(1) a hub mounted for rotation about an axis, (2) a plurality of blades projecting radially from said hub, (3) means connecting each of said blades to said hub to permit blade pitch change motion with respect to said hub about a blade feathering axis and to permit blade folding motion with respect to said hub about a blade fold axis, (4) first means to cause said blades to change pitch with respect to said hub during normal propeller or rotor operation, (5) and second means including a cam and follower arrangement to cause said blades to change pitch during blade fold operation, and wherein said first and second means are independent of one another and each is inoperative when the other is operating.

12. Apparatus according to claim 11 wherein said cam and follower arrangement is mounted to be fully enveloped within said hub and hub-to-blade connecting means.

13. An aircraft propeller or rotor including:

(1) a hub mounted for rotation about an axis, (2) a plurality of blades projecting radially from said hub, (3) means connecting each of said blades to said hub to permit blade pitch change motion with respect to siad hub about a blade feathering axis and to permit blade folding motion with respect to said hub about a blade fold axis, (4) means to cause said blades to fold and unfold about said blade fold axis with respect to said hub between an operable position and a folded position, (5) first means to cause said blades to change pitch with respect to said hub during normal propeller or rotor operation, (6) and second means including a cam and follower arrangement responsive to blade folding and unfolding motion with respect to said hub to cause said blades to change pitch during blade fold and unfold operation.

14. Apparatus according to claim 13 wherein said cam and follower arrangement includes:

(1) a cam follower member connected to said blade for rotation therewith about said feathering axis so that said cam follower motion is rotary about and in a plane perpendicular to the blade feathering axis when the blade changes pitch during normal propellor or rotor operation, (2) and a cam defining member attached to said hub so that its only motion is rotary motion about said axis of rotation with said hub and shaped to define a cam slot including a first portion positioned to receive said cam follower and to exert no force thereon when said first blade pitch change means causes said blade to change pitch during normal propeller or rotor operation and a second portion positioned and shaped to receive and guide the cam follower during blade folding and unfolding operation and to cause the cam follower and hence the blade to rotate about the blade feathering axis to thereby program blade pitch during the blade folding and unfolding operation.

15. Apparatus according to claim 14 wherein said first section of the cam slot extends transversely of said feathering axis and said second portion of the cam slot is shaped to be of constant radius for constant pitch control and varying radius for changing pitch control about said blade fold axis when viewed in cross section.

16. Apparatus according to claim 11 wherein a separate and replaceable cam defining member is provided for each blade and is shaped to program blade pitch so that each blade changes pitch during the final blade folding operation in accordance with the pitch change requirements of that particular blade.

17. Apparatus according to claim 11 wherein each of said blades carries a cam follower for rotation therewith about said feathering axis and extending perpendicular to said feathering axis and wherein said hub carries a detachable cam slot defining member for each of said blades with the cam slot of each cam slot defining member specially contoured to the pitch change requirements of the blade with which it is used and so that the pitch change characteristics of a blade may be changed by substituting a properly contoured cam slot defining member.

18. An aircraft rotor including:

(1) a plurality of blades each having a feathering axis and mounted on the rotor for pitch change variation about their respective feathering axes, for pivot motion about a flapping axis, and for blade folding with respect thereto.

(2) first means to vary the pitch of said blades about their respective feathering axes during normal rotor operation, (3) and second means including an individual cam and follower arrangement enveloped in each blade to vary the pitch of each of said blades individually about their respective feathering axes during blade folding operation.

19. Apparatus according to claim 18 wherein said blade folds with respect to the rotor about said flapping axis.

20. An aircraft rotor including:
 (1) a rotor hub mounted for rotation about an axis,
 (2) a plurality of airfoil blades projecting radially from said hub,
 (3) means connecting each of said blades individually to said hub for motion with respect thereto about a lead-lag axis, a feathering axis and a flapping axis and including:
  (a) a cruciform member pivotally connected to said hub for rotation about said lead-bag axis,
  (b) a blade root spindle extending along said blade feathering axis,
  (c) a blade sleeve enveloping said spindle and supporting said spindle for rotation about said blade feathering axis,
  (d) a first blade pitch control slot defining member positioned within said cruciform member and including support members attaching the pitch control slot defining member rigidly to the cruciform member along said flapping axis so that cam slot defining member may pivot about said lead-lag axis with said cruciform member,
 (4) cam follower means connected to said blade spindle and positioned to engage the cam slot in said cam slot defining member and contoured to control blade pitch about the feathering axis when said blade folds with respect to said hub about said flapping axis.

21. Apparatus according to claim 20 and including means to cause said blade and sleeve to fold with respect to said hub and cruciform member about said flapping axis.

22. Apparatus according to the preceding claim and including means to lock said cruciform member against lead-lag motion during the blade folding operation.

23. Apparatus according to claim 21 and including second pitch change means to cause the pitch of said blades about their respective feathering axes to vary during normal rotor operation.

24. An aircraft rotor including:
 (1) a hub mounted for rotation about an axis,
 (2) a plurality of blades each having a feathering axis and mounted on said hub for pitch change variation about their respective feathering axes, and blade folding with respect, thereto,
 (3) first means to vary the pitch of said blades about their respective feathering axes during normal rotor operation,
 (4) means to stop said rotor for transition between normal rotor operation and blade folding operation,
 (5) and second means including a cam and follower arrangement to vary the pitch of said blades about their respective feathering axes during blade folding operation with said rotor so stopped.

25. An aircraft rotor including:
 (1) a plurality of blades each having a feathering axis and mounted on the rotor for pitch change variation and blade folding and unfolding with respect to the rotor,
 (2) and means responsive to blade fold and unfold motion and including an individual cam and follower arrangement enveloped in each blade to program the pitch of each of said blades individually about their respective feathering axes during blade folding and unfolding operation.

26. Apparatus according to claim 15 wherein said second portion of said cam slot is shaped so as to maintain said blades in the full feather position throughout the first portion of the blade folding opeartion and to vary the pitch of the blades during the latter portion of the blade folding operation so as to bring the blades to proper storing pitch when the blades are completely folded.

27. Apparatus according to claim 26 wherein said cam slot permits said blades to fold through approximately 90° and wherein the cam slot is shaped so that during approximately the first 75° of blade folding the blades are maintained in their full feather position and during the final 15° of folding the blades change in pitch to assume their optimum pitch position for storage when the blades are fully folded.

28. An aircraft propeller or rotor including:
 (1) a hub mounted for rotation about an axis,
 (2) a plurality of blades projecting radially from said hub,
 (3) means connecting each of said blades to said hub to permit blade pitch change motion with respect to said hub about a blade feathering axis and to permit blade folding motion with respect to said sub about a blade fold axis,
 (4) first means to cause said blades to change pitch with respect to said hub about their respective feathering axes during normal propeller or rotor operation including:
  (a) a pitch horn attached to each of said blades and extending therefrom to define a free end,
  (b) a swash plate positioned concentrically about said axis of rotation and mounted to be translatable therealong and tiltable with respect thereto,
  (c) push rods pivotally connected at their first ends to said swashplate and at their second ends to said free end of said pitch horns to form a pivotal connection therewith so that as said swash plates moves, said push rods cause said pitch horns to rotate said blades about their feathering axes to vary the pitch thereof and wherein said pivotal connection between said pitch horn free end and said push rod is in substtantial alignment with said blade fold axis when said blades are in their full feather position,
 (5) and second means including a cam and follower arrangement to cause said blades to change pitch about their respective feathering axes during blade fold operation, and wherein said first and second means are independent of one another and each is inoperative when the other is operating.

29. The method of folding the blades of an aircraft propeller or rotor in flight, which rotor has a pitch control system for normal rotor operation and a pitch control system for blade folding comprising the steps of:
 (1) feathering the rotor blades to stop rotation of the rotor,
 (2) positioning the rotor blades to the desired blade folding position,
 (3) unlocking the rotor blades from the hub for folding,
 (4) commencing the folding process to activate the second pitch control system,
 (5) deactivating the first control system,
 (6) folding the blades while maintaining them in their full feather position in the first portion of the blade folding operation,
 (7) and changing the pitch of the blades during the final portion of the blade folding operation to attain optimum blade pitch in the blade folded position.

30. The method of folding the blades of an aircraft propeller or rotor in flight, which rotor has a pitch control system for normal rotor operation and a pitch control system for blade folding comprising the steps of:
 (1) feathering the rotor blades to stop rotation of the rotor,
 (2) indexing the rotor to the desired blade folding position,
 (3) unlocking the rotor blades from the hub for folding, (4) commencing the folding process to activate the second pitch control system,
(5) deactivating the first control system,
(6) folding the blades while maintaining them in their full feather position during the initial 75° of the blade folding opeartion,
(7) and changing the pitch of the blades during the final 15° of the blade folding opeartion to attain optimum blade pitch in the blade folded position.

References Cited
UNITED STATES PATENTS

| | | | |
|---|---|---|---|
| 3,187,818 | 6/1965 | Barrett et al. | 170—160.12 |
| 3,404,852 | 10/1968 | Sambell et al. | 244—7 |
| 3,428,271 | 2/1969 | Hollrock et al. | 170—160.12 X |

EVERETTE A. POWELL, Jr., Primary Examiner

U.S. Cl. X.R.

244—7